US008832645B2

(12) United States Patent
Woodall et al.

(10) Patent No.: US 8,832,645 B2
(45) Date of Patent: *Sep. 9, 2014

(54) QUICK-CREATING OBJECTS IN AN APPLICATION

(75) Inventors: Zachary P. Woodall, Issaquah, WA (US); Dan Hough, Seattle, WA (US); Kumar Srinivasamurthy, Redmond, WA (US); Nishant Kumar, Redmond, WA (US); Pavel R. Karimov, Redmond, WA (US); Stephen I. Lesser, Redmond, WA (US); Clinton Covington, Kirkland, WA (US); Michael J. McCormack, Snohomish, WA (US); Christopher W. Bryant, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

This patent is subject to a terminal disclaimer.

(21) Appl. No.: 12/640,096

(22) Filed: Dec. 17, 2009

(65) Prior Publication Data
US 2010/0094915 A1 Apr. 15, 2010

Related U.S. Application Data

(63) Continuation of application No. 11/218,024, filed on Aug. 31, 2005, now Pat. No. 7,774,755.

(51) Int. Cl.
G06F 9/44 (2006.01)
G06F 9/45 (2006.01)
G06F 17/21 (2006.01)
G06F 3/0481 (2013.01)
G06F 17/30 (2006.01)
G06F 3/0482 (2013.01)
G06F 17/24 (2006.01)

(52) U.S. Cl.
CPC ............ *G06F 17/211* (2013.01); *G06F 3/0481* (2013.01); *G06F 17/3056* (2013.01); *G06F 9/4443* (2013.01); *G06F 3/0482* (2013.01); *G06F 17/246* (2013.01)
USPC .............. 717/109; 703/13; 717/121; 717/168

(58) Field of Classification Search
CPC .............. G06F 9/4443; G06F 3/0481–3/0482; G06F 17/3056
USPC ....................................................... 717/109
See application file for complete search history.

(56) References Cited

U.S. PATENT DOCUMENTS 5,485,600 A 1/1996 Joseph
5,832,473 A 11/1998 Lee
(Continued)

OTHER PUBLICATIONS

Habraken, Joe, "Microsoft Office 2003 All in One"; ch. 10-11; Nov. 2003, Que Publishing, 17pg.*

*Primary Examiner* — Ryan Coyer
(74) *Attorney, Agent, or Firm* — Rachael Vaughn; Jim Ross; Micky Minhas

(57) ABSTRACT

A palette of representations that can be generated by an application for database, spreadsheet, word processing, and the like, is provided in response to a request for a new object within the application. If the application already has one or more objects open at the time of the request, the representations are also determined based on the context of the data such as from any currently open object(s). The new object is then generated based on the selected representation from the palette, the context of the data, and a structure of data consumed by the application. The layout parameters for the new object are automatically set based on the current context, the structure of the data, and the selected representation.

20 Claims, 7 Drawing Sheets

(56) References Cited

U.S. PATENT DOCUMENTS

| | | |
|---|---|---|
| 6,226,637 B1 | 5/2001 | Carey |
| 7,774,755 B2 * | 8/2010 | Woodall et al. ............... 717/121 |
| 2002/0046394 A1 | 4/2002 | Do |
| 2005/0289524 A1 | 12/2005 | McGinnes |

* cited by examiner

QUICK-CREATING OBJECTS IN AN APPLICATION

This application is a continuation of U.S. patent application Ser. No. 11/218,024, filed Aug. 31, 2005, the entirety of which is hereby incorporated by reference.

BACKGROUND

Database, spreadsheet, and word processing applications include a variety of mechanisms for viewing and interacting with data. A user is provided a number of choices to view and handle the content by selection programs called Wizards, drop-down menus, option selections in setup utilities, and the like.

For example, some spreadsheet applications, such as Microsoft Excel®, begin a new document creation process by presenting the user with a number of preset spreadsheet types. Once the user makes a selection a blank spreadsheet formatted with the preset parameters specified by the selection is opened. If the user desires to modify formatting or layout of the spreadsheet, columns and rows may be added through drop-down menus and other means. Additional characteristics of the spreadsheet such as formatting, visibility of lines, etc., may be modified using options and other drop-down menu items.

SUMMARY

In response to a request for a new object within an application, a palette of representations that can be generated by the application is provided. The representations may also be selected based on the context of data that is consumed by the application. The context of the data may be derived from currently open object(s) and other mechanisms. The new object is generated based on the selection of a representation from the palette as well as the context of the data. The layout parameters for the new object are set automatically based on the current context and the selection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
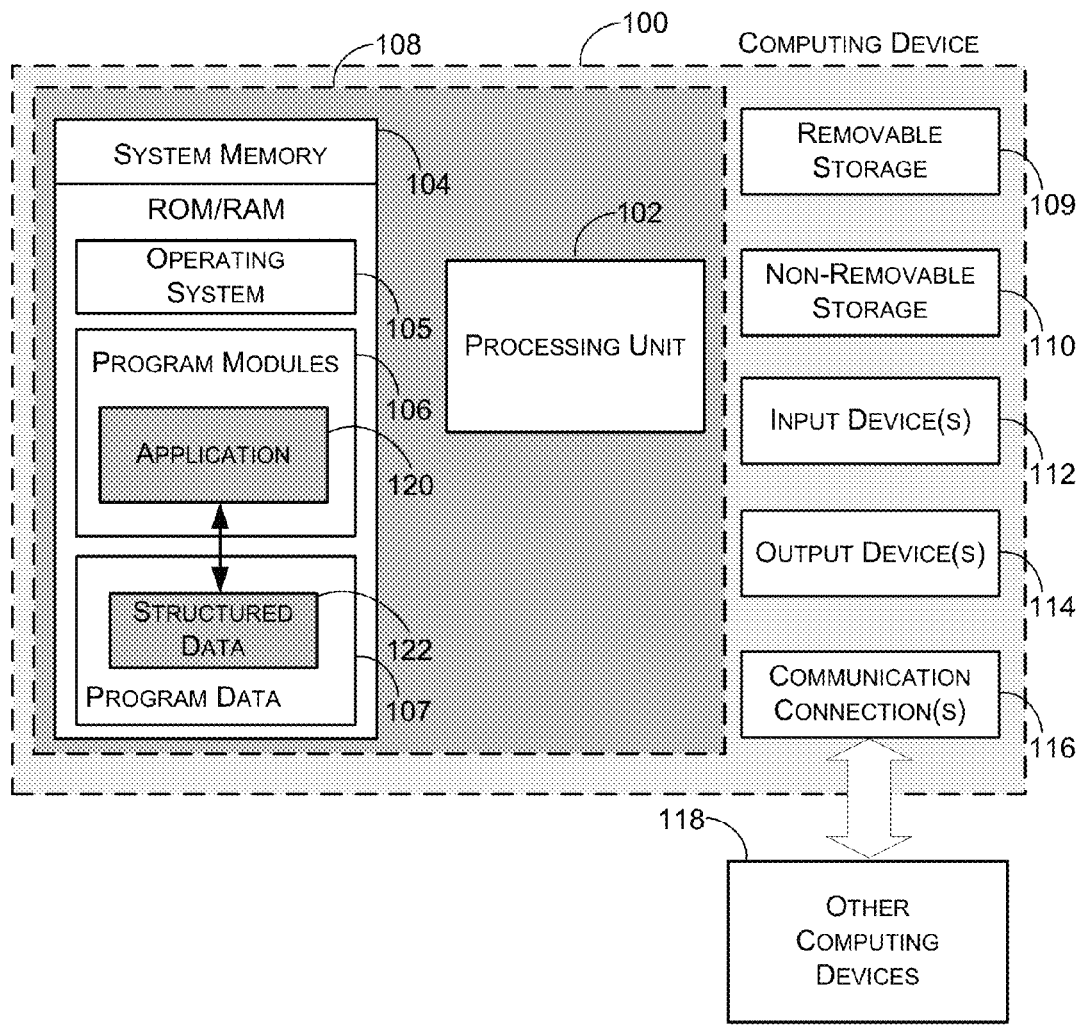
FIG. 1 illustrates a computing device in which an application according to an example embodiment may be executed.

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, the following terms are defined as follows, unless the context clearly dictates otherwise. The term "object" refers to a representation of data within an application such as a database application, spreadsheet application, word processing application, and the like. For example, an object may be a Word® document, an Excel® workbook, etc. Embodiments are not limited to these examples, however. Implementations may be made in other types of applications and other types of objects known in the art.

Users of complex information processing systems may desire to get some valuable information out of the system, but have a difficult time conceiving a visualization that enables them to easily take advantage of the system's capabilities. In many instances, this is because applications do not provide a visual representation of what the format of the information will be upon delivery, and what formatting options are available.

For example, traditional Wizard experiences in database applications, such as Microsoft Access®, are designed to provide users with a jumping-off point for creating new objects. The produced objects may be difficult to change at a later time point. It is also not possible to re-enter the Wizard to make changes. This results in the users often deleting the object they have created and recreating the object from scratch using the Wizard. Typically, users may perceive making changes to the objects more difficult than recreating the objects using the Wizard.

According to one embodiment, a new object is generated within an application based on a user selection from a palette of representations that can be generated by the application, and based on the context of data such as any currently open object(s). The application automatically sets the layout parameters of the new object based on the user's selection from the palette of representations as well as the context of the data. For example, if a user creates a new report on employees in MS Access®, and each employee has salary data, that context is automatically detected and the salary information aggregated into a total at the bottom of the report.

Illustrative Operating Environment

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, program modules 106 further include application 120. Application 120 may include database, spreadsheet, word processing applications, and the like. Application 120 may use structured data 122 within program data 107 and interact with other computing devices through communication connection(s) 116.

Figure 2:
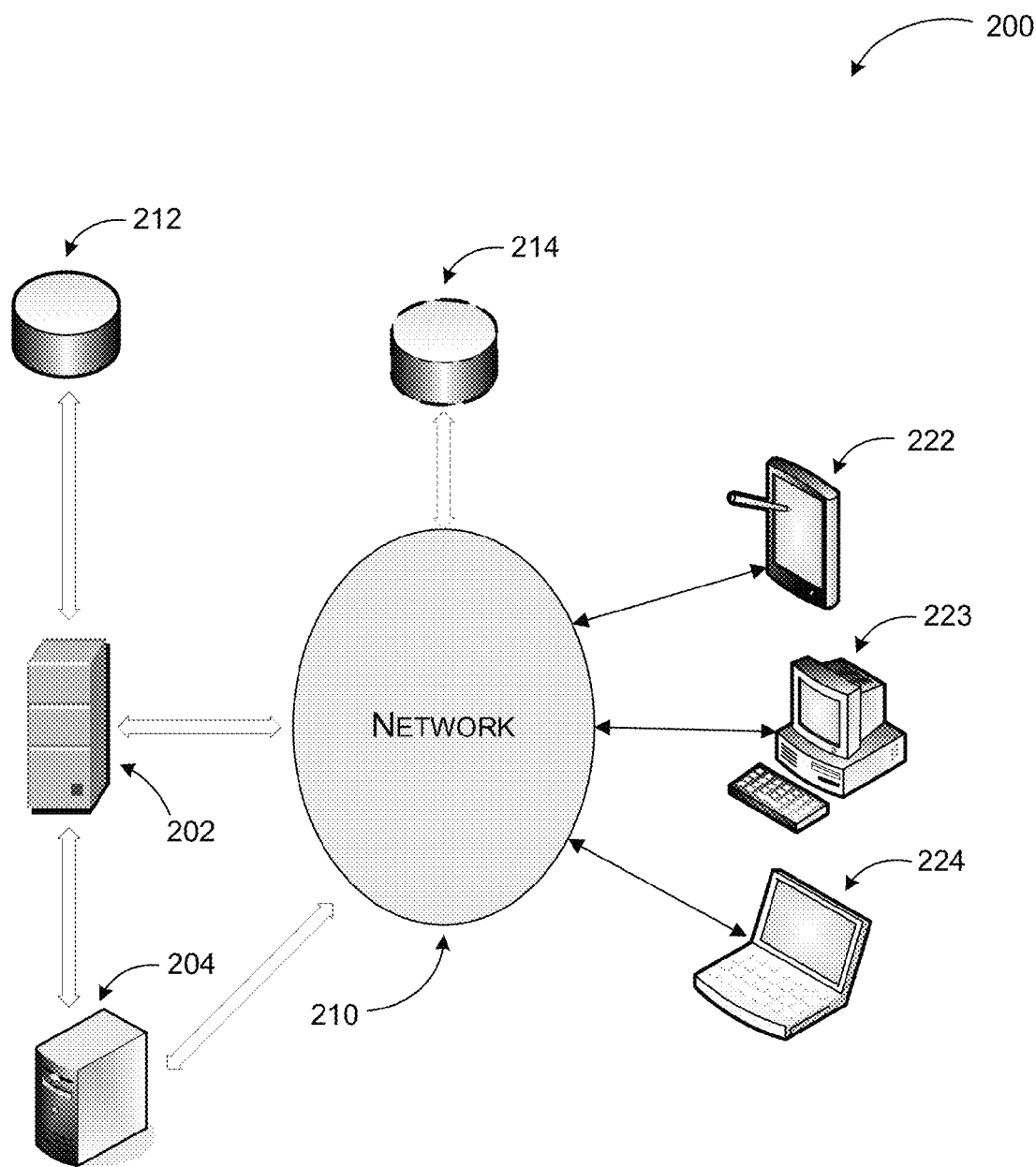
FIG. 2 illustrates an example system, where example embodiments may be implemented.

FIG. 2 illustrates example system 200, where embodiments may be implemented. System 200 may comprise any topology of servers, clients, Internet service providers, and communication media. Also, system 200 may have a static or dynamic topology.

System 200 includes server 202, in which an application such as application 120 of FIG. 1 may be executed. Client devices 222-224, which include PDA 222, remote client 223, and laptop 224, may interact with server 202 and enable a user to interact with the application. In some embodiments, the application may be executed separately on client devices 222-224 and some aspects may be shared through network 210. In other embodiments, different applications may be executed in client devices 222-224 and server 202 with the applications interacting with one another for different tasks.

For example, a database application may be running on server 202 with users at client devices 222-224 employing various aspects of the application such as financial reports, task lists, and the like. An email application may be running on server 204. Server 202 may interact with server 204 directly or over network 210 and task lists in the database application may cause reminder emails being sent to various users by the email application running on server 204.

Content (data) for objects that are generated by applications in the servers or client devices may be stored within the same devices or in remote storage facilities such as database 212 and 214. Applications may retrieve data from these storage facilities directly or over network 210.

Network 210 may be a secure network such an enterprise network, or an unsecure network such as a wireless open network. Network 210 provides communication between the nodes described above. By way of example, and not limitation, network 210 may include wired media such as a wired network or direct-wired connection, and wireless media such as acoustic, RF, infrared and other wireless media.

Computing devices and applications described herein are provided for illustration purposes and do not constitute a limitation on aspects of the present invention.

Illustrative Embodiments for Quick-Creating Objects in an Application

Embodiments are related to automatically generating an object in an application based on a user selection among a number of choices provided by the application and a context of an object currently in use.

Figure 3:
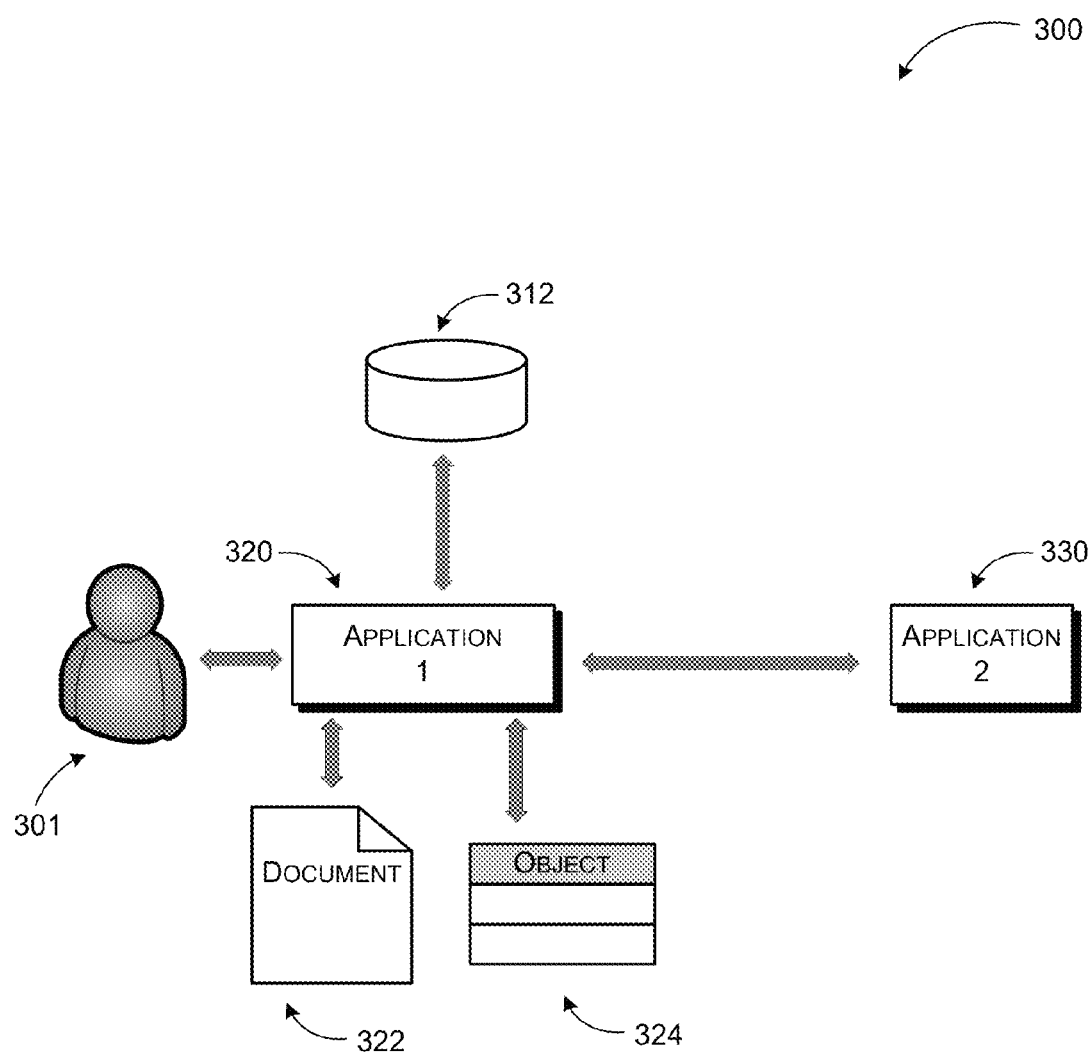
FIG. 3 illustrates a diagram of generating and handling objects and documents in an application according to aspects.

FIG. 3 illustrates a diagram of generating and handling objects and documents in an application. Application 1 (320) may be a database, spreadsheet, or word processing application, or some other application.

User 301 interacts with application 1 performing actions on objects and documents such as creating, editing, viewing, printing, and the like. Objects and documents are representations of data within application 1 (320) that are intended to help the user visualize, modify, save the data, and so on. For example, an object may be a chart of data currently being processed by a database application. The document may be a word processing document that is used to present word processing data (text, graphics, etc.) as well as save it in a storage facility such as data storage 312.

As described previously, application 1 may be run on a single computing device, may be distributed over multiple devices on a network, and the like. Furthermore, application 1 (320) may interact with other applications like application 2 (330) as part of the operation. Application 2 (330) may perform some of the tasks associated with application 1. In another embodiment, application 2 (330) may complement application 1 (320) by performing tasks associated with object 324 or document 322 such as printing, saving, encoding, and the like.

The object creation mode of the operation of application 1 is different from typical Wizard experiences. This object creation mode provides a highly visible main entry point for creating new objects, and as such may advertise hidden or buried functionality of the application as well as automate many tasks. By providing the user with detailed graphical representations of objects a number of decisions to be made by the user is reduced.

Moreover, a number of properties for the new object can be inherited from the context of the current object further reducing the burden on the user in creating the new object. Details of actions taken by an application in an example quick-create mode are described below.

Figure 4:
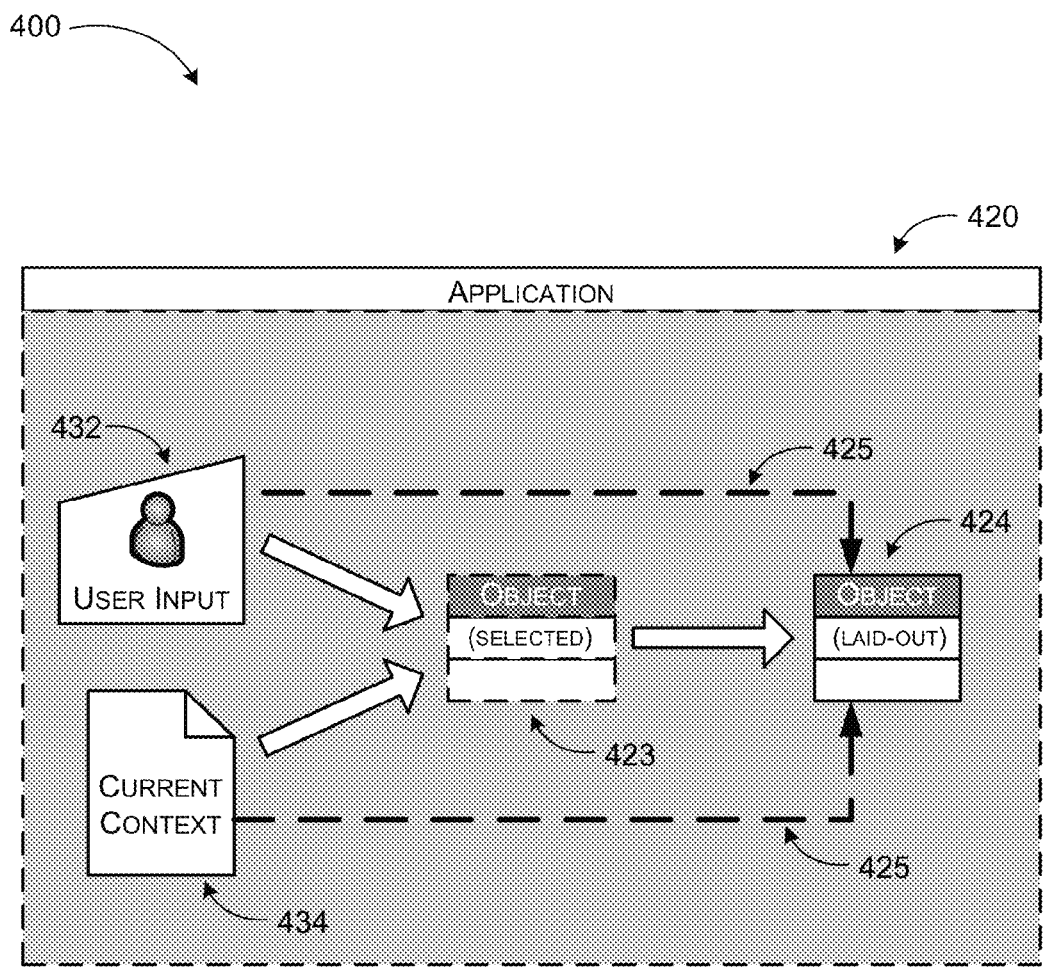
FIG. 4 illustrates generation and layout of an object in an application.

FIG. 4 illustrates diagram 400 of generation and layout of an object in an application. Application 420 can be a database application, a spreadsheet application, a word processing application, and the like. The quick-create mode of application 420 may be initiated by the user without any other objects being open or while one or more object are already open.

Upon request of a new object to be opened, application 420 evaluates the context of currently open object(s) such as type of data, layout properties of the currently open object(s) such as caption, formatting, and the like. Based on the evaluation, application 420 presents the user with graphically descriptive choices for the new object. If no objects are currently open, application 420 may use default values.

While context of currently open object(s) is used for example purposes, embodiments may be implemented using other mechanisms to inherit context of data for the new object.

Graphically descriptive choices may be presented in any container construct including, but not limited to, a vertical or horizontal strip of icons, a free-floating window, a navigation pane, a menu, a command bar, a dialog container, and the like. The graphically descriptive container may include icons or other menu items indicating different object types that the application is capable of managing. The choices may be grouped according to their properties.

For example, in a database application, new objects may include tables, forms, reports, and charts. Accordingly, the container construct may present the most commonly used types of these objects grouped under each category.

Once the user makes a selection, user input 432 and current context 434 are used to generate new object 423. The new object is created using the same data as the original object and inheriting the data context. The new object may present the data in a different format such as creating a report from a form and vice versa.

The next step in creating the new object is finalizing the layout of the object such that laid-out new object 424 can be presented to the user. User input 432 and current context 434 are also used for this step of the operations as indicated by arrows 425. For example, a report created based on a document that includes customer information while the user is working on the first name of a customer may be created with title and caption "Customers By First Name" and list customer information by first name.

In one embodiment, two approaches may be employed in laying out the new object, the constructionist approach and the destructionist approach. In a scenario where the new object is to include a small portion of the original data, the constructionist approach may be the more appropriate one (start from blank). For a new object that is to include a majority of the original data with minor modifications, the destructionist approach may be the more appropriate one.

In the constructionist approach, the new object is built with minimal inheritance such that the user can build (construct) the rest of the object by making choices such as dragging from a field list onto the new object.

For destructionist approach, the new object is created with a much higher level of inheritance and automatic generation of controls by the application. The user is then provided with the option of removing or modifying (destructing) individual pars of the new object. Such parts may include fields, which are visible in the original object (inherited object). For example, when inheriting from a table with a sub-datasheet, the fields from both the main table and its first sub-datasheet may be included in the new object.

If context is inherited from a form with sub-forms or a report with sub-reports and the data context can be inherited from the sub-forms or sub-reports, the visible fields in the form and its sub-forms are included in the new object. Group headers and footers for each sub-form or sub-report's data, which are used to provide summary information such as group name for a group of records, are also created and the controls bound to fields from that sub-form or sub-report's query may be moved to the group header for that group.

Additionally, object specific properties may be automatically added at the second stage based on inherited properties. These may include adding date, time, page numbers for reports, creating subtotals and totals for certain data types such as salaries, expenditures, and the like.

Once the new object is created, the user has the option of modifying any or all of the properties of the object. A user may also be given the choice of determining which properties are to be automatically configured by the application.

Figure 5:
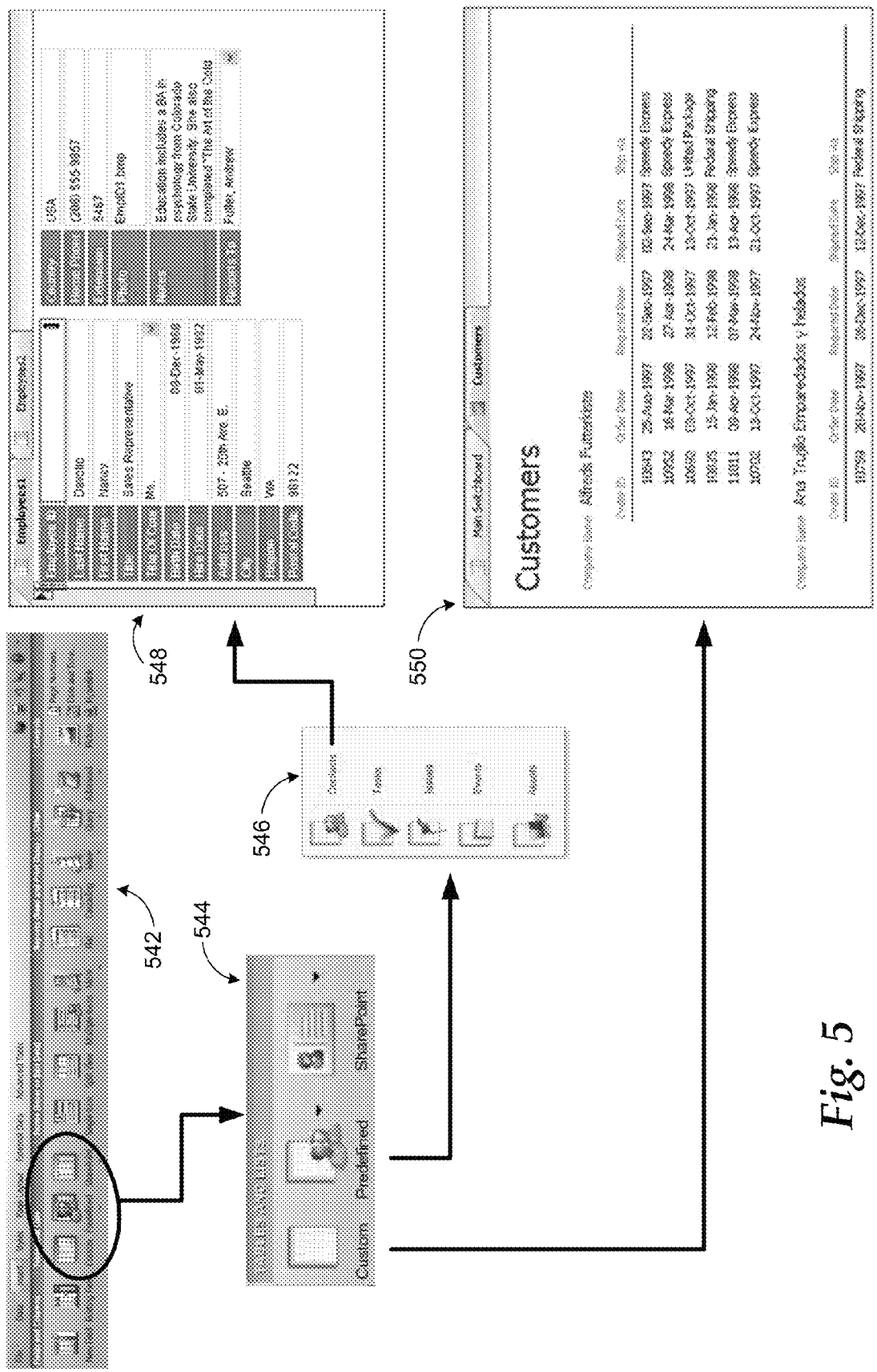
FIG. 5 illustrates screenshots of an example application for creating tables according to aspects.

FIG. 5 illustrates screenshots of an example application for creating tables according to aspects. The example application in this case is Microsoft Access®. However, embodiments are not limited to this example application, and may be implemented in any application that creates objects and documents. First screenshot shows container construct 542 presented to a user with selections of available object types.

Container construct 542 is in a horizontal strip form that includes different objects such as custom tables, predefined tables, single item forms, split view forms, flat reports, cascading reports, and the like grouped in their categories. The categories and number of available types in each category may be determined dynamically based on the context of data, for example from currently open object(s).

Screenshot 544 shows the "Tables and Lists" category of container construct 542. As seen on the screenshot, three main types of tables are provided to the user. For users, who wish to use most of the current data with minor modifications or who wish to start from a new table, "custom" table choice is provided. If a user selects "custom" table, the new object, shown in screenshot 550, includes a table with default parameters and the used data. The title of the new object, "Order Details Summary" may be inherited from a currently open object. The user can then make modifications to formatting or content within the application.

A second alternative in the "Tables and Lists" category is enabling the user to choose among a number of "Predefined" tables. The available choices under this selection are presented in a drop-down menu style. Screenshot 546 shows five examples of "Predefined" tables: Contacts, Tasks, Issues, Events, Assets. Each of these choices results in a preformatted table object being created. For example, selecting Contacts, results in the "Employees" table shown in screenshot 548.

The application automatically lays out the new table based on default parameters and controls from the context of the data, inheriting the title (Employees) from a currently open object. If multiple levels of data are selected from the currently open object, cascading tables as shown in the screenshot may be created.

It should be noted that the new object is linked to the data such that any changes to the data are also reflected in any currently open object that use the same data.

In another embodiment, the formatting of the object, for example field sizes and margins, may be determined based on a size of data for each field.

Figure 6:
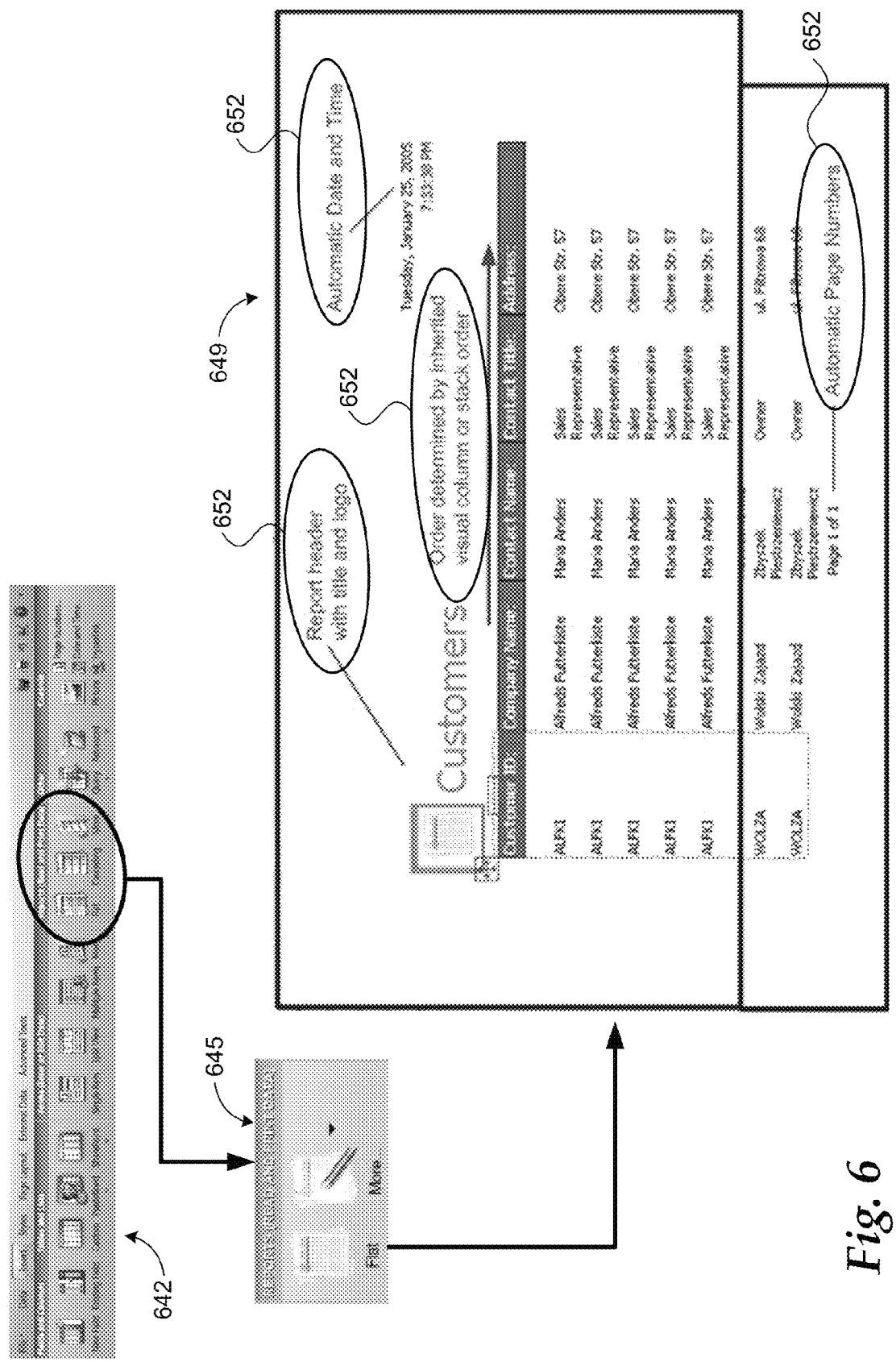
FIG. 6 illustrates screenshots of an example application for creating reports according to aspects.

FIG. 6 illustrates screenshots of an example application for creating reports according to aspects. The screenshots are again from Microsoft Access®, while embodiments are not limited to this specific example. First screenshot showing container construct 642 is the same as the first screenshot of FIG. 5.

The selected category in this scenario, shown in screenshot 645, is Reports. In a database application, forms may, typically, be used for entering and editing data, while reports are used for viewing and printing data.

Forms may include single item forms, split forms, multiple item forms, and the like. Reports may include flat, stepped, block, cascading, and summary reports, and the like.

Screenshot 645 shows choices available under the "Reports" category. In one embodiment, commonly used report types may be listed based on the context of the currently open object. In another embodiment, some available types may be provided in a drop-down menu style (e.g. "More" icon).

The selection of a "Flat" type report results in a single report document as shown in screenshot 649. The report depicted in screenshot 649 is an abbreviated version of the full report with some actions of the application indicated in comments 652. For example, the report header including the title and the logo are inherited as explained previously. An order of the columns in the report is determined by inherited visual column order. Because a report is most commonly used for viewing and printing data, date and time are automatically inserted to the top of the document. Page numbers may also be inserted along with other formatting features.

Further examples of application based automation in opening and laying out the new object include addition of subtotals and totals in reports that include financial data such as salaries, expenditures, and the like. Determining the type of data in the currently open object, the application may insert subtotals to each sub-report and a total aggregating the subtotals to the top-level report.

Figure 7:
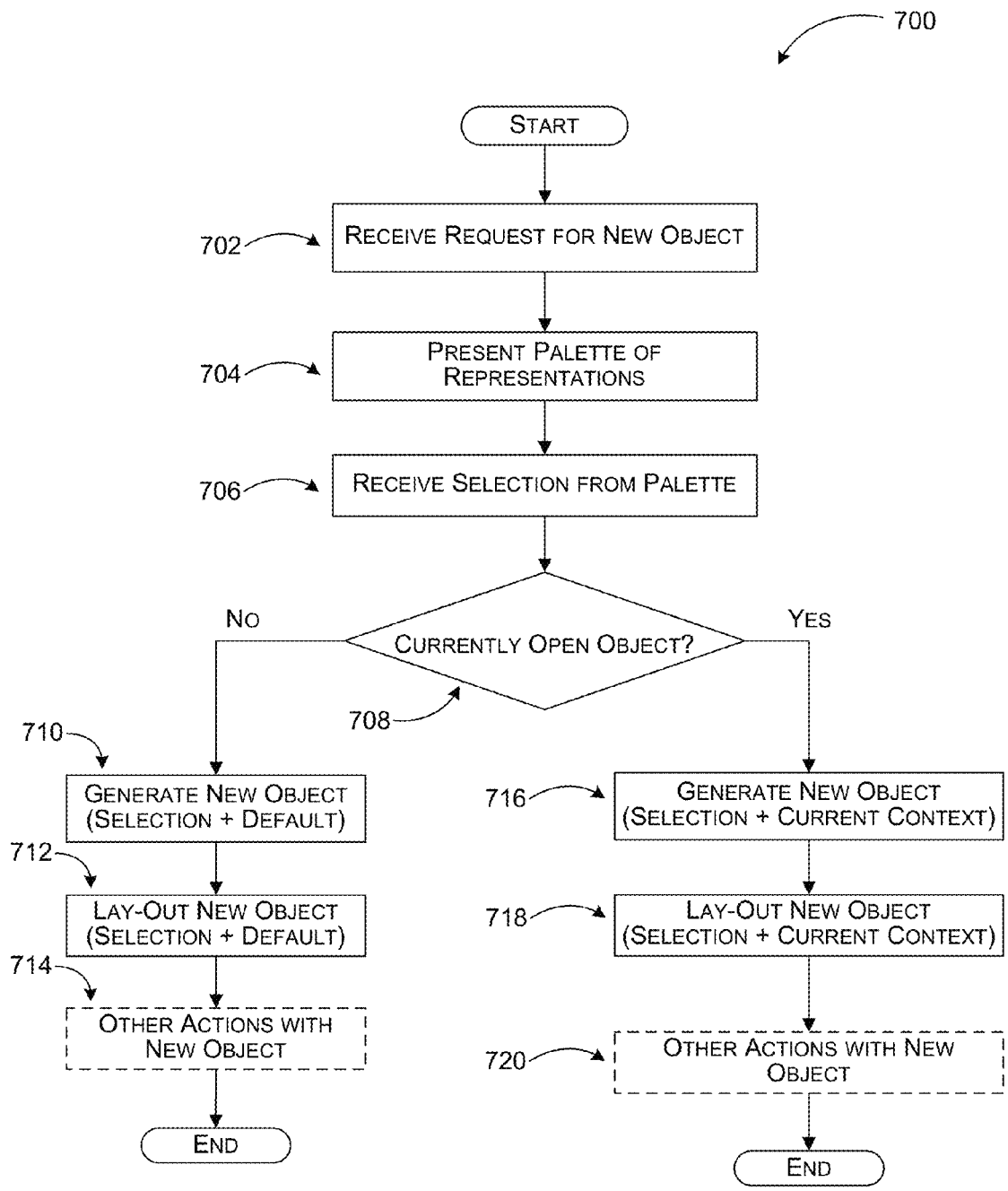
FIG. 7 illustrates a process for quick-creating objects in an application.

FIG. 7 is a logic flow diagram illustrating process 700 for quick-creating objects in an application.

Process 700 begins at operation 702, where a request for a new object is received by the application. The request may be made from within an object currently being managed by the application, without any other object being open, etc. Processing advances from operation 702 to operation 704.

At operation 704, the user is presented with a palette of representations for data the application is capable of providing. In one embodiment, the representations may be provided in a container construct grouped under different object types such as forms, reports, tables, charts, and the like. Processing proceeds from operation 704 to operation 706.

At operation 706, a user selection among the representation choices is received by the application. Processing moves to decision operation 708 next.

At decision operation 708, a determination is made whether any other object is currently open. If the user is requesting the new object while working in another object, properties and other parameters associated with the new object may either be determined based on the currently open object or inherited from it. Other mechanisms may also be employed to inherit properties, and the like of the new object from the context of the data. A negative decision at operation 708 advances processing to operation 710.

At operation 710, the new object is created based on the user selection from the container construct and default parameters for the object. Processing then moves to operation 712, where layout parameters for the new object are determined.

Layout parameters such as formatting, captioning, visualization, and the like, may also be determined based on the selection at operation 706 and default parameters within the application. Processing proceeds from operation 712 to optional operation 714.

At optional operation 714, other actions associated with the new object are performed by the application. For example, the new object may be a report in a database application and additional actions may include printing the report. After optional operation 814, processing moves to a calling process for further actions.

If the decision at decision operation 708 is affirmative, processing moves to operation 716. At operation 716, the new object is created based on the user selection from the container construct and a context of the currently open object. In another embodiment, the object may also be created based on default parameters in the application.

The context of the currently open object may include parameters associated with the object such as caption, type, and the like. It may also include information associated with a structure of the data consumed by the application in association with the currently open object. For example, the currently open object may be a spreadsheet of financial information that includes expenditures, income, etc. The fact that the data in the currently open object includes currency may be used to determine the new object. Processing then moves to operation 718.

At operation 718, layout parameters for the new object are determined. Layout parameters such as formatting, captioning, visualization, and the like, may also be determined based on the selection at operation 706 and the context of the currently open object as explained above.

During the lay-out of the new object, new information may be inserted into the new object in addition to inherited formatting and other layout parameters. Such information may include generic data such as date and time, page numbering, and the like. It may also include specific data such as subtotals and totals for financial reports. To insert such specific information automatically, the application may first determine whether the currently open object includes currency data and whether the requested object type is a report. Processing proceeds from operation 718 to optional operation 720.

At optional operation 720, other actions associated with the new object are performed by the application similar to operation 714. In another example, the new object may be a task list in a database application and additional actions may include interacting with an email application to send out alerts to predetermined users associated with the tasks. After optional operation 720, processing moves to a calling process for further actions.

The operations included in process 700 are for illustration purposes. Quick-creating objects in an application may be implemented by a similar process with fewer or additional steps including interacting with other applications.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for automated generation of a new database object within a database application, the method comprising:

displaying a plurality of selectable controls, each control in the plurality of selectable controls graphically describing a different type of database object in a plurality of types of database objects, each type of database object in the plurality of types of database objects being a different representation of data stored in a database;

receiving a selection indicating a selected control from among the plurality of selectable controls;

determining, by a computing device, in response to receiving the selection, whether there is a currently open database object in the database application, the currently open database object being a representation of data in the database;

when there is a currently open database object, generating, by the computing device, the new database object, the new database object being a type of database object described by the selected control, the new database object being a representation of the data represented by the currently open database object, the representation of the data represented by the currently open database object comprising one or more fields which are visible in the currently open database object;

modifying a layout of the new database object in response to input from a user and a current context of the data, the current context of the data comprising one or more parameters associated with the new database object and information associated with a structure of the data represented by the currently open database object; and displaying the new database object.

2. The method of claim 1, wherein modifying the layout of the new database object comprises: adding a field to the new database object.

3. The method of claim 1, wherein modifying the layout of the new database object comprises: removing a field from the new database object.

4. The method of claim 1, wherein the plurality of types of database objects include forms, reports, tables, and charts.

5. The method of claim 4, wherein the new database object and the currently open database object are different types of database objects.

6. The method of claim 1, wherein displaying the plurality of selectable controls comprises displaying a container construct comprising a strip of the selectable controls.

7. The method of claim 1, wherein the new database object has a same title as the currently open database object.

8. The method of claim 1, wherein the data in the new database object is linked to the data in the currently open database object such that changes to the data in the new database object are reflected in the currently open database object.

9. The method of claim 1, further comprising: adding, by the computing device, totals of data in the currently open database object to the new database object.

10. The method of claim 1, further comprising: when there is no currently open database object, generating, by the computing device, the new database object in response to receiving the selection, wherein the layout of the new database object is a default layout of the type of database object described by the selected control.

11. A computing device comprising:
a processing unit implemented as hardware; and
at least one computer storage medium storing instructions that, when executed by the processing unit, cause the computing device to:
display a plurality of selectable controls, each control in the plurality of selectable controls graphically describing a different type of database object in a plurality of types of database objects, each type of database object in the plurality of types of database objects being a different representation of data stored in a database;
receive a selection indicating a selected control from among the plurality of selectable controls;
determine, in response to receiving the selection, whether there is a currently open database object in the database application, the currently open database object being a representation of data in the database;
in response to determining that there is a currently open database object, generate the new database object in response to receiving the selection, the new database object being a type of database object described by the selected control, the new database object being a representation of the data represented by the currently open database object, the representation of the data represented by the currently open database object comprising one or more fields which are visible in the currently open database object; and
modify a layout of the new database object in response to input from a user and a current context of the data, the current context of the data comprising one or more parameters associated with the new database object and information associated with a structure of the data represented by the currently open database object.

12. The computing device of claim 11, wherein the instructions cause the computing device to modify the layout of the new database object by causing the computing device to remove a field from the new database object.

13. The computing device of claim 11, wherein the plurality of types of database objects include forms, reports, tables, and charts.

14. The computing device of claim 13, wherein the new database object and the currently open database object are different types of database objects.

15. The computing device of claim 11, wherein the instructions cause the computing device to display the plurality of selectable controls by causing the computing device to display a container construct comprising a strip of the selectable controls.

16. The computing device of claim 11, wherein the new database object has a same title as the currently open database object.

17. The computing device of claim 11, wherein the data in the new database object is linked to the data in the currently open database object such that changes to the data in the new database object are reflected in the currently open database object.

18. The computing device of claim 11, wherein the instructions, when executed by the processing unit, further cause the computing device to add totals of data in the currently open database object to the new database object.

19. The computing device of claim 11, wherein the instructions, when executed by the processing unit, further cause the computing device to:
generate, when there is no currently open database object, the new database object in response to receiving the selection, wherein the layout of the new database object is a default layout of the type of database object described by the selected control.

20. A computer storage medium not consisting of a transmission signal, the computer storage medium comprising instructions that, when executed by a processing unit implemented as hardware in a computing device, cause the computing device to perform a method comprising:
displaying a plurality of selectable controls, each control in the plurality of selectable controls graphically describing a different type of database object in a plurality of types of database objects, each type of database object in the plurality of types of database objects being a different representation of data stored in a database, wherein the plurality of types of database objects include forms, reports, tables, and charts;

receiving a selection indicating a selected control from among the plurality of selectable controls;

determining, in response to receiving the selection, whether there is a currently open database object in the database application, the currently open database object being a representation of data in the database;

when there is a currently open database object, generating the new database object in response to receiving the selection, the new database object being a type of database object described by the selected control, the new database object being a representation of the data represented by the currently open database object, the representation of the data represented by the currently open database object comprising one or more fields which are visible in the currently open database object, wherein the new database object and the currently open database object are different types of database objects;

when there is no currently open database object, generating the new database object, wherein the layout of the new database object is a default layout of the type of database object described by the selected control;

modifying a layout of the new database object in response to input from a user and a current context of the data, the current context of the data comprising one or more parameters associated with the new database object and information associated with a structure of the data represented by the currently open database object; and displaying the new database object, wherein the data in the new database object is linked to the data in the currently open database object such that changes to the data in the new database object are reflected in the currently open database object.

* * * * *